UNITED STATES PATENT OFFICE 2,387,259

HIGH BOILING UNSATURATED PRODUCTS OF PETROLEUM PYROLYSIS AND HEAT POLYMERS THEREFROM

Edwin L. Hall, Manchester, N. H., and Howard R. Batchelder, Drexel Hill, Pa., assignors to The United Gas Improvement Company, a corporation of Pennsylvania Application December 18, 1940, Serial No. 370,608

10 Claims. (Cl. 260—80)

This invention pertains to high boiling heat polymerizable unsaturated monomeric material recovered from tar formed during the production of combustible gas by processes involving the pyrolytic decomposition of hydrocarbon oil, with or without the aid of catalysts, and heat polymers of said monomeric material.

Various processes are known for the manufacture of combustible gas such as carburetted water gas and oil gas, wherein a petroleum oil such as crude oil or a fraction thereof, for example, gas oil or residuum oil, is pyrolytically decomposed.

In such processes petroleum oil is pyrolyzed in vapor phase and at reduced partial pressures due to the presence of diluent gas such as blue water gas and/or steam and at relatively high temperatures such as 1300° F. average set temperature and above as measured by standard type shielded thermocouples.

In such processes the gas leaving the gas-making apparatus is usually brought into contact with water such as in the wash-box, and as a result the tar which separates from the gas is usually recovered in the form of an emulsion with water. Thus the tar emulsion in extreme cases may contain as high as 95% water or even higher. In some cases the tar emulsion may be in the form of a pasty solid of very high viscosity. Frequently, the tar emulsion will contain at least 50% water and in this respect differs from tars obtained in processes for the production of coal gas or coke oven gas, or in many oil cracking processes for the production of motor fuel, for in the latter processes the tar as recovered is not in an emulsion form. Therefore, the terms "tar emulsion" or "petroleum tar emulsion" as used hereinafter and in the claims refer to emulsions of tar and water produced in the manner described; namely, during the manufacture of combustible gas by processes involving the pyrolytic decomposition of petroleum oil.

The recovered mixture of tar and water from gas-making operations involving the decomposition of petroleum oil is usually first collected in a settling tank for the separation of as much water as possible by layer formation and decantation.

In accordance with prior art practice the relatively stable tar emulsion which remains after separation of the water layer is usually treated according to some method of dehydration such as centrifuging or distillation.

Centrifugal methods of treating tar emulsions, however, separate only the tar and the water of the emulsion and do not separate lighter tar constituents from the heavier. Furthermore, the presence of free carbon in the emulsion may give rise to operating difficulties.

The separation of the tar emulsion by distillation results in fractions which comprise (1) water, (2) a distillate from the tar comprising light oil and dead oil, and (3) residual tar.

For purposes of convenience in description, that portion of the distillate boiling up to approximately 200°–210° C. at atmospheric pressure will be designated "light oil" and that portion of the distillate boiling above approximately 200°–210° C. at atmospheric pressure will be designated "dead oil." These may be separated by distillation.

The light oil fraction contains, among other things, valuable saturated and unsaturated aromatic hydrocarbons such as benzene, toluene, xylene, styrene, methyl styrene, indene, etc.

The dead oil fraction contains naphthalene, methyl and other substituted naphthalenes, and may contain anthracene, methyl anthracene, as well as numerous other hydrocarbons for the most part as yet unidentified.

The residual tar still contains polymerizable constituents.

The residual tar has a number of uses. For example, it may be used as a road tar, or as a heavy liquid fuel. For both purposes the control of the viscosity of the residual tar is of importance because of its effect upon the ease of handling.

Due to the fact that the tar is subjected to elevated temperatures for considerable lengths of time in ordinary distillation procedures of the prior art for breaking the emulsion and for the separation of light oil and dead oil as distillate, substantial polymerization is caused to take place. Such polymerization tends to reduce the quantity of distillate on the one hand and to increase the viscosity of the residual tar on the other, both of which are undesirable.

These disadvantages are effectively overcome in the practice of the invention described and claimed in our copending application Serial No. 342,735 filed June 27, 1940, which has matured into Patent 2,366,899 granted Jan. 9, 1945.

In accordance with the process of said copending application Serial No. 342,735, tar emulsions may be dehydrated in a manner (1) such that the yield of dead oil therefrom may be increased at the expense of residual tar without encountering a corresponding increase in viscosity of the residual tar; or (2) such that for a given yield of dead oil, a residual tar of lower viscosity is obtainable than by conventional methods. Furthermore, it is possible to obtain by said process of said copending application Serial No. 342,735 a higher dead oil yield than is possible by conventional methods.

Residual tar viscosity is of importance in the art. For example, an increase in tar viscosity results in an increase in handling difficulty. With the process of said copending application Serial No. 342,735, more dead oil may be recovered for any given selected residual tar viscosity than by conventional methods for tar dehydration in use at the present time.

In the practice of the process of said copending application Serial No. 342,735, a tar emulsion is rapidly heated to an appropriate temperature and then discharged into a separation zone which may be maintained at any desired suitable pressure, such as under vacuum, under conditions such that (1) the vaporized portion may be rapidly removed, and condensed and cooled to below polymerizing temperatures; and (2) the unvaporized portion may be rapidly removed and cooled to below polymerizing temperatures.

By such procedure the material in process does not remain at operating temperatures for protracted periods. Thus, polymerization is materially reduced with the result that a larger proportion of the tar itself may be taken off overhead as distillate along with the water while processing the bottom or residual material to any given residual tar viscosity.

It will be understood that two factors affect residual tar viscosity, namely (1) the proportion of relatively fluid oils left in the residual tar which may be controlled by the proportion of volatile material removed overhead, and (2) the proportion of unsaturated material polymerized into less volatile, more viscous polymers. In the process of said copending application Serial No. 342,735, assuming that other things remain unchanged, item (1) preceding may be increased and decreased by decrease and increase in the temperature to which the original tar is subjected. However, consideration should be given to the effect of higher temperatures upon item (2) preceding taken in conjunction with heating time. Since polymerization is a function of both temperature and time, the effect of higher temperatures during shorter heating times may be made the equivalent of the effect of lower temperatures during longer heating times. We find, however, that a relatively wide range of both temperature and heating time is afforded particularly when operating at sub-atmospheric pressures, without losing the advantage over conventional methods of tar dehydration, although it is preferred to maintain item (2) preceding at a virtual minimum or at least relatively low.

It has been found that in separating the dead oil and light oil components of the products of petroleum oil pyrolysis from pitch constituents without polymerization or with materially reduced polymerization, that not only may an increased quantity of hydrocarbons boiling in the range from 210° C. to 350° C. be recovered for a given tar viscosity, but a large part of this increase may consist of readily heat polymerizable unsaturated aromatic monomeric material which on polymerization by heat yields valuable resins. This is particularly so in that portion of the above boiling range above 235° C. and still more particularly so above 265° C.

The readily heat polymerizable material is accompanied by a considerable quantity of unsaturated aromatic monomeric material boiling in the range of from 210 to 350° C. not readily polymerized by heat but readily polymerizable catalytically, as by catalysts such as $H_2SO_4$, $AlCl_3$ and $BF_3.Et_2O$ and others.

The unsaturated monomeric material readily polymerizable by heat tends to be in greater concentration in the higher boiling portion of boiling range from 210 to 350° C., while the unsaturated monomeric material not readily polymerized by heat tends to be in greater concentration in the lower boiling portion of the boiling range from 210 to 350° C.

The unsaturated monomeric material boiling in the range from 210 to 350° C. is accompanied by saturated hydrocarbons boiling in the same range.

The larger part of the above mentioned heat polymerizable unsaturated monomeric material is so readily polymerizable by heat that it may be polymerized by heating at 200° C. for two hours. Polymerization at 200° for four hours may produce further resin, after which but little polymerization is effected by longer heating.

In the ordinary methods of distilling tar by batch distillation, the prolonged heating which is of the order of 16 hours at relatively high temperature, polymerizes this readily heat polymerizable monomeric material, in and together with the heavy black pitch constituents of the residual tar in which the polymers are lost. As a result the monomers do not appear in the hydrocarbon material boiling in the range of from 210 to 350° C. after separation from the higher boiling pitchy material comprising the residual tar.

As a result of separation of the light oil and dead oil components of the products of petroleum oil pyrolysis from the residual tar, without polymerization or with materially reduced polymerization, a substantially pitch free hydrocarbon material may be separated having a portion boiling within the range of from 210 to 350° C. which contains from 5% to 30% and higher of monomeric unsaturated hydrocarbons readily polymerizable by heat.

The particular concentration of this heat polymerizable monomeric material will depend upon the amount of polymerization produced in the separation from the residual tar, as well as upon such factors as the conditions of pyrolysis and the character of the petroleum oil pyrolyzed. Other conditions being equal, petroleum oils which are characterized as naphthenic in the Bureau of Mines classification described in Bureau of Mines Bulletin 291 as modified by Bureau of Mines Report of Investigations 3279 tend to produce more of the above described heat polymerizable monomeric material than oils classified as paraffinic in said Bureau of Mines classification. Petroleum oils of Bureau of Mines classes 5 to 7 inclusive and cuts from such oils are especially preferred.

As previously stated the above mentioned heat polymerizable monomeric material may be readily polymerized by heat to form valuable resins.

Polymerization may be effected by heating the total material separated from the residual tar sufficiency to polymerize readily heat polymerizable monomers boiling within the range of from 210° to 350° C. but insufficiently to appreciably polymerize heat polymerizable material contained in lower boiling ranges such for instance as methyl styrenes and styrene for example by heating with stirring for 4 hours at 200° C. followed by distillation under vacuum to extract the resin.

It may be preferable however to first effect a separation by fractional distillation between light oil boiling below say 210° C. and dead oil boiling above say 210° C.

The heat polymerizable monomeric material boiling within the range 210° to 350° C. is so readily polymerizable by heat, that in the fractional distillation of the light oil from a dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring for example for four hours at 210° C.

The resin thus produced together with any resin produced during the separation of the light oil from the dead oil may then be extracted by distillation under vacuum.

The high boiling heat polymerizable unsaturated monomeric material and the resins produced therefrom will be further referred to and described in connection with and after a more detailed description of the process of said copending application Serial No. 342,735, which more detailed description is made in connection with the accompanying drawings in which.

Figure 1:
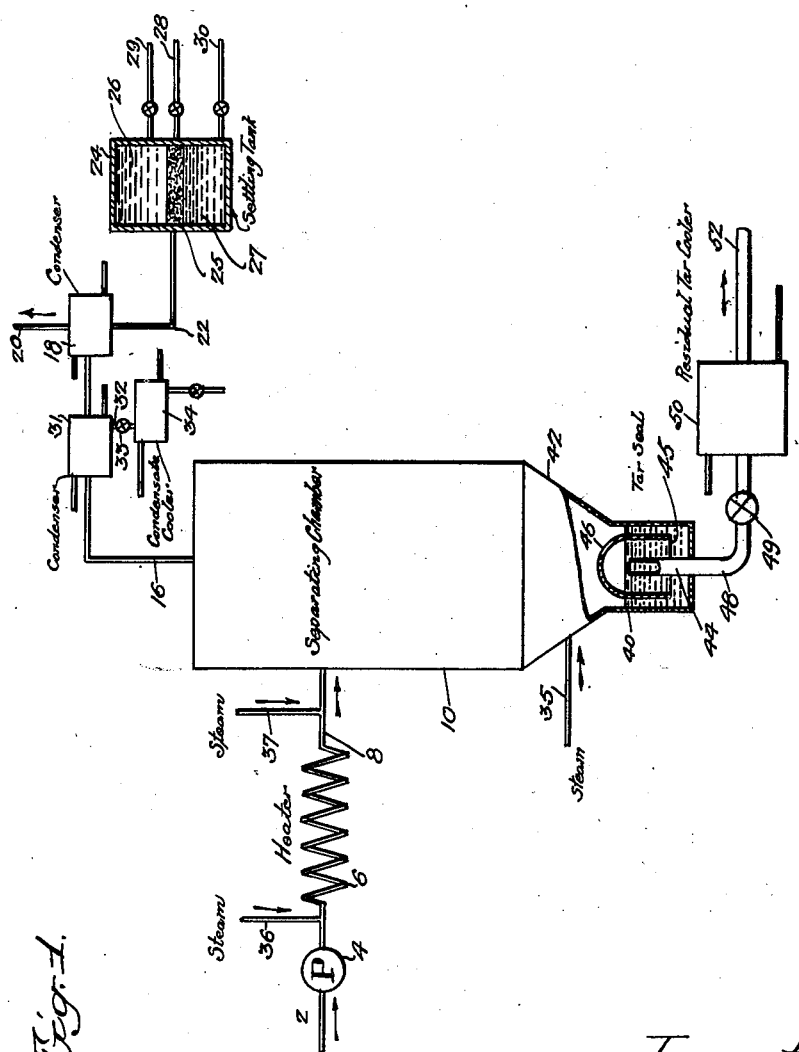
Figure 1 is a flow sheet illustrating one embodiment of the process of said copending application Serial No. 342,735.

Referring now to Figure 1, tar-water emulsion is introduced by pipe 2 and pump 4 into a heater 6 in which its temperature is raised appropriately and from which the heated material flows through pipe 8 into separating zone or chamber 10.

The more more volatile materials contained in the tar emulsion including water, light oil and dead oil are vaporized in heater 6 and the heated mass is projected into chamber 10.

Chamber 10 is designed to facilitate the rapid separation of the vaporized and unvaporized portions. For example, it may be relatively empty.

The vaporized portion rises to the top of chamber 10, flows through line 16 to condenser 18 from which the resulting condensate, cooled to a desired temperature, flows through line 22 to settling tank 24, and from which any uncondensed or uncondensible gas flows off such as through line 20 for further condensation, or other treatment, or otherwise as desired.

The unvaporized portion which comprises the residual tar falls to the bottom of chamber 10, and as in the case of the vaporized portion, it is preferably rapidly removed from chamber 10 and cooled. Removal of residual tar may be accomplished either continuously or intermittently, for example, by the use of a hand operated or automatically operated valve appropriately associated with the bottom of chamber 10, or a level-operated pump, or a submerged pump in a well, each being preferably operated to avoid a considerable accumulation of tar in chamber 10.

As illustrated the residual tar is removed automatically and continuously through a liquid seal formed by the tar itself.

No particular form of apparatus is critical for this purpose, although we find that some forms are more satisfactory than others. One form which is very satisfactory is indicated diagrammatically at the bottom of chamber 10.

The base of separating chamber 10 is shown reduced in diameter thus forming well 40 which is connected to the main body of the chamber 10 by a sloping frusto-conical wall 42.

An inner pipe 44 passes through and rises from the bottom of the well 40 to create an annular zone 45. An inverted cup 46 is disposed above and around pipe 44 and as shown extends downwardly into annular zone 45.

Residual tar dropping to the bottom of chamber 10 enters annular zone 45 about the outside of cup 46, flows down around and into the inside of the cup, and overflows the top of riser 44 from which it flows through pipe 48 into residual tar cooler 50 in which the residual tar is preferably cooled sufficiently to substantially reduce or prevent any further polymerization. The residual tar flows from cooler 50 through pipe 52 to any suitable point such as to storage.

Since the liquid seal holds only a small amount of residual tar which is constantly washed away and out of chamber 10 by the newly formed residual tar, it will be seen that no portion of the residual tar after separation is held at elevated temperatures for an extended period of time.

While the flow of residual tar from chamber 10 is preferably continuous, it may be continual or intermittent if desired, for any reason. Thus, we have shown a valve 49 in pipe 48 to facilitate such continual or intermittent withdrawal, should such be desired for any reason.

Returning now to the settling tank 24, the function of which is primarily to separate the various layers which form from the condensate, it is found that an emulsion layer indicated generally at 25 sometimes forms between the hydrocarbon distillate layer indicated at 26 and the water layer indicated at 27.

Accordingly, settling tank 24 is illustrated with three outlets, 28, 29, and 30 for draining off emulsion, hydrocarbon distillate and water, respectively.

The hydrocarbon distillate may be further processed such as by fractionation to produce desired hydrocarbon fractions. For example, it might be initially separated into light oil and dead oil.

The water may be discarded or utilized in some manner, if desired.

The emulsion, if any, may be further treated to recover its hydrocarbon content. Thus, the emulsion may be passed through a filter bed capable of breaking the same, of which filter beds made of sand, lead wool, steel wool, etc., are examples. On the other hand, this emulsion might be recycled through heater 6 and chamber 10.

It is found that the ratio of emulsion (if any) to hydrocarbon distillate and water may vary considerably with operating conditions and the character of the tar undergoing treatment.

It is also found that the tendency of the hydrocarbon distillate and water to form emulsions may be very substantially reduced, if not eliminated, by fractionally condensing from the vapors leaving chamber 10 a part or all of the relatively higher boiling hydrocarbons, leaving substantially all of the water and the rest of the hydrocarbon distillate to be condensed in condenser 18 and separated in settling tank 24. This partial condensation washes from the overhead vapors any finely divided solid or semi-solid matter such as finely divided carbon particles which are apparently responsible for the formation of emulsions when they occur. Other steps may be employed for removing these particles should they occur in the vapors. Thus chamber 10 may be designed or operated in such a manner as to avoid carrying overhead emulsion-forming materials.

Any desired means may be employed for condensing out relatively high boiling hydrocarbons from the vapors flowing from separating chamber 10. For example, a partial condenser 31 is illustrated in line 16 between condenser 18 and chamber 10.

High boiling hydrocarbons condensed in condenser 31 may be drained off through outlet 32 controlled by valve 33 into cooler 34.

Other things remaining equal, the temperature to which a given tar emulsion is heated in heater 6 will depend upon the desired ratio of hydrocarbon distillate to residual tar, it being understood that the higher the temperature the higher the ratio of hydrocarbon distillate to residual tar and the higher the residual tar viscosity.

It is found that as a general rule, with other things remaining the same, including the temperature of heating, the ratio of hydrocarbon distillate to residual tar increases with increase in the percentage of water in the tar emulsion. It follows that for any given ratio of hydrocarbon distillate to residual tar the final temperature reached in heater 6 decreases with increase in percentage of water in the tar emulsion undergoing treatment.

The phenomena is quite apparently connected with the reduction in partial pressure of the hydrocarbon distillate vapor as a result of the presence of steam generated from the water in the tar emulsion.

Accordingly, should it be desired to further decrease the partial pressure of the vapors of the hydrocarbon distillate in any case and thus, for example, take a larger proportion of hydrocarbon distillate off overhead, or the same proportion at a lower temperature, steam might be added at an appropriate point such as at 35 at the bottom of chamber 10 or at 36 at the inlet to heater 6, or at 37 at the outlet of heater 6, or at any other appropriate point or points.

It will, of course, be understood that water itself might be added at 36 since it would be vaporized to steam in passing through heater 6.

The partial pressure of hydrocarbon distillate vapors may also be reduced by reducing the pressure in chamber 10, as already referred to above. This may be conveniently accomplished by attaching pressure regulating mechanism, for example, a vacuum pump, to outlet 20 of condenser 18, proper steps being taken to effectively drain condensate into settling tank 24, for instance, by inserting a vacuum leg in line 22 or connecting settling tank 24 to vacuum.

Since polymerization is a function not only of temperature but also of time, we prefer to bring the tar emulsion undergoing treatment to the desired temperature in heater 6 as rapidly as practicable and then immediately discharge it into chamber 10 for separation of its components.

It is also preferred to have at least the preponderate part of the vaporization take place in heater 6 so as to abstract at least the preponderate part of the necessary heat of vaporization directly from heater 6. In other words, it is preferred to operate such that flashing of liquid to vapor in the separating chamber 10 occurs, if at all, only to a relatively minor extent, or at most is only incidental to the preponderate vaporization in heater 6.

Since for any given temperature in heater 6, other things remaining unchanged, the amount of vaporization will decrease with increase in pressure, it is preferred to choose or design heater 6 so as to have a relatively small pressure drop between the point at which the materials undergoing treatment reach the maximum temperature and the point at which they are projected into the chamber 10. This is to permit the preponderate part of the vaporization to take place within the heater itself. The total pressure drop across the heater will depend upon its design and operation and keeping in mind what has just been said, it may have any desired or convenient value high or low.

However, should it be desired for any reason, higher pressures might be employed.

If desired, extraneous heat may be added to chamber 10, for example, by adding superheated steam at 35 at a temperature above the average temperature of chamber 10. Another means of adding heat to chamber 10 is by the insertion of a steam or other heating coil therein. Other means for adding heat to chamber 10, if desired, will occur to persons skilled in the art upon becoming familiar herewith.

Generally speaking, however, we usually prefer to restrict any heating of chamber 10 to compensate for unavoidable heat losses.

The following examples will serve to further illustrate the process of said copending application Serial No. 342,735.

Example 1

A tar emulsion containing 75% water was processed in a small pilot plant corresponding in general to Figure 1 of the drawings. The separating chamber was operated under a pressure of approximately 50 mm. of mercury and the tar emulsion was heated in a manner such that the temperature of the materials leaving the heater was maintained at approximately 235° F.

64% of the tar (neglecting the water) was recovered as distillate and 36% as residue.

The viscosity of the tar residue in S. S. F. @ 210° F. was 219.

A sample of the same tar emulsion processed by a conventional tar dehydration method involving distillation to the same residual tar viscosity yielded (neglecting the water) only 45% distillate, and 55% tar residue.

Example 2

Another tar emulsion containing 68% water was processed in the same manner as in Example 1. The pressure in the separating chamber was held at approximately 50 mm. of mercury and the temperature of the materials in process at the outlet of the heater was maintained at approximately 257° F.

65% of the tar (neglecting the water) was recovered as distillate and 35% as residue.

The tar residue had a viscosity in S. S. F. @ 210° F. of 165.

Another sample of the same tar emulsion processed conventionally to the same residual tar viscosity yielded (neglecting the water) only 42% distillate, and 58% tar residue.

Example 3

Another tar emulsion of a somewhat different character and containing 65% water was processed in the same manner as in Example 1, the pressure in the separating chamber being maintained at approximately 50 mm. of mercury. The temperature of the materials undergoing treatment at the outlet of the heater was maintained at approximately 268° F.

55% of the tar (neglecting the water) was recovered as distillate and 45% as residue.

The viscosity of the tar residue in S. S. F. @ 210° F. was 530.

Another sample of the same tar emulsion processed conventionally to the same tar viscosity yielded (neglecting the water) only 39% distillate, and 61% tar residue.

The foregoing examples amply demonstrate certain of the advantages of the process of said copending application Serial No. 342,735, over the conventional processes of the prior art. It has the further advantage as compared with prior art processes as hereinbefore stated, of producing a substantially pitch free distillate containing a substantial concentration of valuable high boiling heat polymerizable monomeric material.

A separation of the hydrocarbon distillate obtained in the process of said copending application Serial No. 342,735, into light oil and dead oil fractions shows that the large increase in hydrocarbon distillate by the practice of our process is for the major part, if not preponderately, in dead oil.

In other words, one of the outstanding advantages of the process of said copending application Serial No. 342,735, resides in the recovery of much larger percentages of dead oil than have heretofore been possible, and without disadvantageously affecting the recovery of light oil either quantitatively or qualitatively.

Thus, measurably larger quantities of dead oil are recovered without polymerizing significant quantities of the polymerizable unsaturates in the light oil fraction. Furthermore as hereinbefore stated said dead oil may contain relatively large quantities of heat polymerizable unsaturated monomeric material.

While the tar emulsion may be brought to any desired or convenient temperature in heater 6, consideration being given to its effect upon polymerization, it is preferred to use temperatures between approximately 200° and 350° F. (approximately 93° and 177° C.).

Likewise while any desired pressure may be maintained in chamber 10, it is preferred to operate at pressures below atmospheric. Thus the use of temperatures between approximately 200° and 350° F. in conjunction with pressures between approximately 20 and 200 mm. of mercury (absolute) is found particularly effective.

While the time interval during which a tar particle is subjected to polymerizing temperatures in passing through heater 6 and separating chamber 10 and until it is finally cooled, may vary considerably without sacrificing the advantages of our process, we prefer that this time interval be short, or in other words, that the transit of each tar particle be rapid through zones of sufficiently high temperature to cause polymerization.

Heater 6, chamber 10 and tar seal 40 lend themselves conveniently to designs by which the hold-up of materials in process may be maintained relatively small, thus lending themselves to a rapid transit of tar particles through that portion of the process in which they are subjected to polymerizing temperatures.

The apparatus is preferably so designed and operated that the time interval during which the average tar particle is subjected to temperatures higher than about 120° F. beginning in heater 6 and ending in condenser 18 or cooler 34 or cooler 50 does not exceed 30 minutes, with 5 to 15 minutes as a better figure.

When the highest temperatures do not greatly exceed 200° F., this time interval may be extended somewhat, and when they approach or exceed 350° F., it is preferably shorter.

Accordingly, condenser 18 and coolers 34 and 50 are preferably operated at temperatures below about 120° F. As an example, they may be operated at atmospheric temperature or somewhat above or below, using river water as a cooling medium.

It will be understood of course that the numerous and complex variables involved make it difficult to calculate the time interval just referred to with absolute accuracy. As exemplifying some of these variables may be mentioned the variations in constituency of the tar emulsions, the extremely complex nature of the hydrocarbon components thereof, differences in the physical characteristics of the tar emulsions, the extreme sensitivity to heat of certain constituents thereof, etc.

However, it is possible by making certain simplifying assumptions to derive empirically an expression for the time interval of exposure of tar to elevated temperatures, which expression will serve for practicable purposes in performing the process and will form a valid basis for comparing results obtained.

Thus, for example, it will be helpful to assume that (a) the composition of the tar emulsion is 50% water, 30% oil (light oil plus dead oil), and 20% residual tar; (b) the density of the tar emulsion is 62.5 lbs. per cu. ft.; (c) the increase in volume due to vaporization and/or change in temperature and pressure occurs uniformly throughout the heater, so that the average volume through the heater is one-half the sum of the inlet and outlet volumes; (d) the average molecular weight of the volatilized hydrocarbon material is 130; (e) the density of the residual tar at operating temperature is 62.5 lbs. per cu. ft.; and (f) the operation conditions are at an average temperature of 250° F. in the heater and a pressure of 2 lbs. per sq. in. absolute (i. e., about 100 mm. of mercury) in the separating chamber.

From this it can be shown that the volume of materials entering the heater is negligible in comparison with the volume of the materials leaving the heater. Hence, the average volume of materials through the heater can be taken as one-half of that leaving the heater without introducing any appreciable error.

Furthermore, for the purpose of calculating the said time interval the volume of the tar distillate vapors and of the unvaporized residual tar can normally be neglected. This is because (1) the volume of residual tar is relatively small in comparison to the vaporized material, and (2) the molecular weight of water is so low compared to the average molecular weights of the vaporized hydrocarbons that in the mass leaving heater 6 steam is present in the order of 92% or more by volume. The calculations for the heater proper, therefore, may be made, without introducing too large an error, on the basis of the water content of the tar emulsion.

Stated generally therefore in terms of a throughput of $W$ lbs. of water per hour, a heater temperature of $T°R$ (Rankine), an absolute pressure in the separating chamber of $P$ lbs. per square inch, and a heater volume of $V_h$ cubic feet, the time of exposure in the heater in hours equals:

$$\frac{V_h}{\text{Average volume of water through the heater per hour}} = \frac{V_h}{\frac{1/2 W}{18} \times 359 \times \frac{T}{492} \times \frac{14.7}{P}} = \frac{V_h P}{0.3 WT}$$

If the tar well of the separating chamber has a volume in cubic feet of $V_{tw}$, and the yield of residual tar in pounds per hour is $R_t$, then the time of exposure in the tar well is represented by $$\frac{V_{tw}}{\text{Residual tar per hour (cubic feet)}} = \frac{62.5\, V_{tw}}{R_t}$$

Since the time of exposure of any particular part of the hydrocarbon vapor to temperatures above 120° F. after leaving heater 6 is less than that for liquid residual tar particles because of the speed with which the vapor travels to condenser 18, the approximate average total time interval (in minutes) in the entire apparatus may, therefore, conveniently be expressed as $$60\left(\frac{V_h P}{0.3\, WT} + \frac{62.5\, V_{tw}}{R_t}\right)$$

If the point in the heater at which the materials reach 120° F. is determined at least approximately, and the volume of the heater substituted in the above formula is taken as from that point instead of from the inlet, the formula gives an approximation of the average time interval during which the materials in process are maintained at a temperature above 120° F.

As previously mentioned, the apparatus is preferably so designed and operated that the value of this expression rarely exceeds 30, with 15 as a better figure and 5 as excellent.

It will, of course, be understood that apparatus for carrying out the process of said copending application Serial No. 342,735, may be of any desired design, construction or shape suitable for the purpose.

Thus while chamber 10 has been shown empty, any other suitable interior structure may be adopted consistent with its function as a separating chamber.

Likewise, heater 6 may take any form or shape and may be of any type suitable for the purpose. As an example, a pipe still may be employed although a shell-and-tube heater might also be conveniently employed. The heater 6 is preferably so designed as to insure the discharge of both liquid and vapor into separating chamber 10, for example, by resorting to the self-draining principle for the liquid, or to sufficiently high vapor velocities to carry the liquid along with the vapor, or both, or otherwise. This is, of course, to avoid the separation and polymerization of tar in the heater 6 with resulting stoppages.

Likewise, condensers 18 and 31, coolers 34 and 50 and settling tank 24 may be of any desired construction suitable for their respective purposes.

While the process of said copending application Serial No. 342,735, has been more particularly described in connection with a single vaporization step, it is to be understood that vaporization may be effected, if desired, in a plurality of stages, for instance, two or more.

Figure 2:
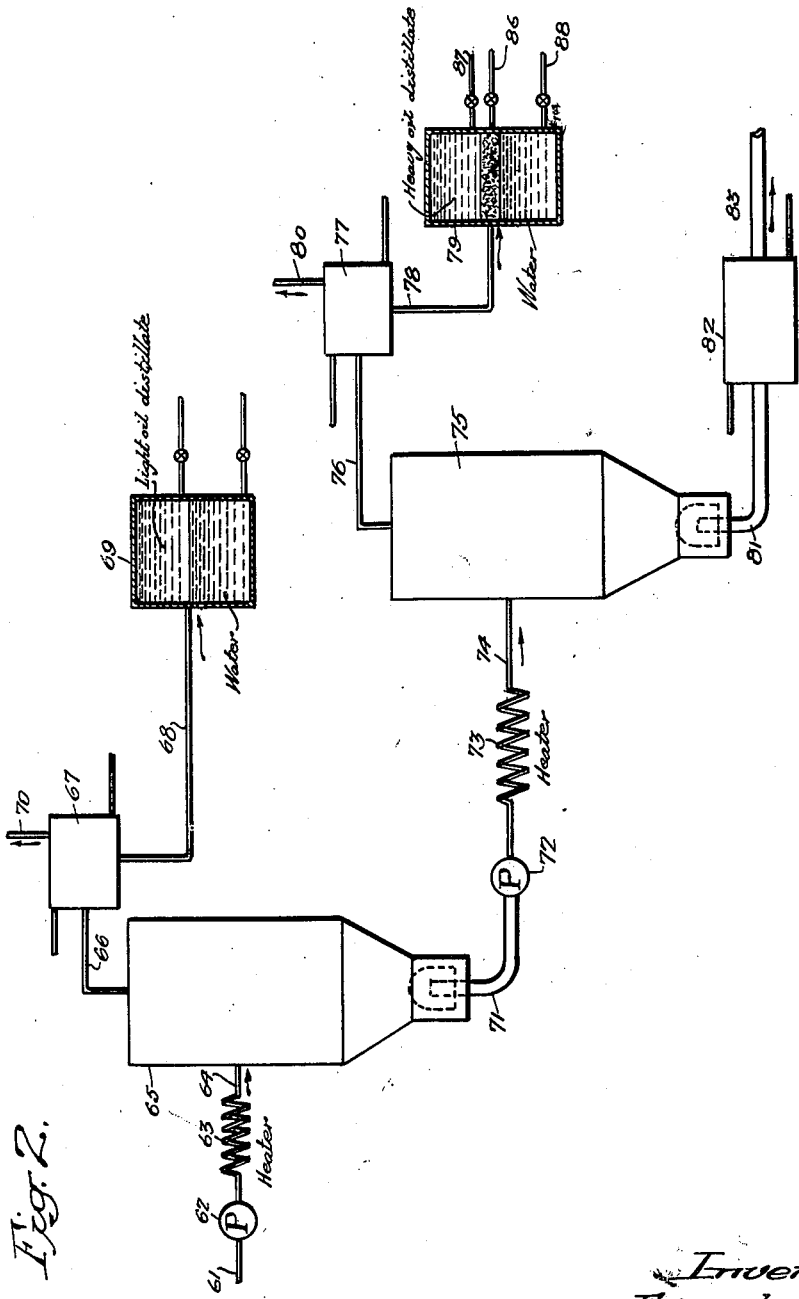
Figure 2 is a flow sheet illustrating another embodiment of the process of said copending application, Serial No. 342,735.

This is more particularly illustrated in Figure 2 wherein tar emulsion is introduced by a pipe 61 and pump 62 into a heater 63 in which its temperature is raised appropriately, for example, between 190° and 230° F., and from which the heated material flows through pipe 64 into separating zone or chamber 65 which may be maintained at any suitable pressure such as atmospheric.

The lighter portions of the volatile materials contained in the tar emulsion, including a substantial part of the light oil and some of the water, are vaporized in heater 63 and the heated mass is projected into chamber 65.

The vaporized portion is taken off through line 66 to condenser 67 from which the condensate flows through line 68 to settling tank 69 and from which any uncondensed or uncondensible gas flows off through line 70 for further condensation or other treatment, or otherwise, as desired.

The unvaporized portion which still contains at least a substantial part of the dead oil and the rest of the water falls to the bottom of chamber 65 and is preferably rapidly removed therefrom with a relatively small, if any, hold-up for the same reasons as given in the particular description of Figure 1 in connection with the removal of residual tar from chamber 10. Accordingly, and for convenience, chamber 65 is illustrated as having the same construction as chamber 10.

The unvaporized material flows off through pipe 71 to pump 72 and then into heater 73 in which its temperature is raised appropriately such as between 200° F. and 350° F., and from which the heated material flows through pipe 74 into separating zone or chamber 75 which may be maintained at any suitable pressure such as between 20 and 200 mm. of mercury, absolute.

The rest of the volatile materials which it is desired to remove from the tar and the rest of the water are vaporized in heater 73 and the heated mass is projected into chamber 75.

The vaporized portion flows off through line 76 to condenser 77 from which the condensate flows through line 78 to settling tank 79 and from which any uncondensed or uncondensible gas flows off through line 80 for further condensation or other treatment, or otherwise, as desired.

The portion left unvaporized in heater 73 and chamber 75 comprises the residual tar which falls to the bottom of chamber 75, and as in the case of the vaporized portion it is preferably rapidly removed from chamber 75 and cooled.

Accordingly, and for convenience, chamber 75 has been illustrated as of the same construction as chambers 10 and 65, although it will be understood that these chambers need not have the same construction and that any other suitable construction might be substituted.

As shown, residual tar flows off through pipe 81 into residual tar cooler 82 in which the residual tar, the same as already described in connection with Figure 1, is preferably cooled rapidly and sufficiently to substantially reduce or prevent any further polymerization. The residual tar flows from cooler 82 through pipe 83 to any suitable point, such as to storage.

The function of settling tank 69 is to separate the various layers which form from the condensate. Since an emulsion layer seldom, if ever, forms in settling tank 69 depending somewhat, of course, upon the amount of hydrocarbon distillate taken overhead, settling tank 69 is illustrated with two outlets for draining off light hydrocarbon distillate and water respectively.

The function of settling tank 79 is also to separate the various layers which form from the condensate and since an emulsion layer might be formed, depending of course upon the design and operation of separating chamber 75, the settling tank 79 is illustrated with three outlets 86, 87 and 88 for draining off emulsion, hydrocarbon distillate and water, respectively.

It is, of course, to be understood that any tendency for an emulsion to form may be reduced or prevented the same as already described in connection with Figure 1, namely by placing a partial condenser in line 76, or by the design and/or operation of separating chamber 75, or both, or otherwise.

It is also to be understood that such emulsion, if any, may be treated to recover its hydrocarbon content the same as already described in connection with Figure 1.

The heavy hydrocarbon distillate has been illustrated in settling tank 79 for convenience as the top layer. Its density is very close to that of water and changes more rapidly with temperature. Accordingly, it is found that the heavy hydrocarbon distillate might comprise the lower layer when temperatures in settling tank 79 are somewhat low.

If desired, steam might be added to either the first or the second vaporization steps, or both, at any appropriate point or points, for example, as illustrated in Figure 1.

The same applies to the addition of supplementary heat to chambers 65 and 75.

In practice it is found that steam will be used more often in connection with the second separation step than in the first, although when the percentage of hydrocarbon distillate taken off in the first step is relatively high, some steam might be desired.

Chambers 65 and 75 may be operated at any desired pressure which may be conveniently regulated at 70 and 80 respectively, such as by venting to the atmosphere or by using pressure regulating mechanism.

Thus, chambers 65 and 75 might be operated at atmospheric, super-atmospheric, or sub-atmospheric pressures, although atmospheric and sub-atmospheric pressures will usually be employed.

As an example, chamber 65 may be operated at atmospheric pressure and chamber 75 at sub-atmospheric pressure.

Thus for example, when the collection of the larger part of the light oil is in settling tank 69 and the larger part of the dead oil is in settling tank 79, chamber 65 may be operated at substantially atmospheric pressure and the temperature of the incoming materials undergoing separation may be between 190° and 230° F.; and chamber 75 may be operated at a pressure between 20 and 200 mm. of mercury and the temperature of the incoming materials may be between 200° and 350° F.

Other combinations of temperatures and pressures will suggest themselves to persons skilled in the art upon becoming familiar herewith.

As in the case of Figure 1, the time interval during which the average tar particle is subjected to temperatures higher than 120° F. preferably does not exceed 30 minutes with 15 minutes as a better figure and 5 minutes as excellent, these times being determined by the formula set forth herein.

A two or more stage process is particularly recommended in cases where the tar emulsion contains relatively high percentages of light materials such as benzene, since the first stage permits such materials to be condensed at a higher pressure than might be desired in the second stage, particularly if it is desired to take a considerable quantity of high boiling material off overhead in the second stage.

For example, to condense vapors having a relatively high benzene content at pressures of the order of 20 mm. of mercury might require temperatures sufficiently low to solidify benzene in the condenser after it is liquefied. Thus, taking off benzene at higher pressures such as atmospheric has distinct advantages when the benzene content of the tar emulsion is relatively high.

On the other hand, duplicate condensers might be provided and used alternately, with one thawing while the other is in use, should solidification difficulties be encountered. Other means for overcoming any such difficulties, should they occur, will become apparent to persons skilled in the art upon becoming familiar herewith.

Apparatus for a three or more stage treatment will become apparent to persons skilled in the art upon becoming familiar with the foregoing.

Many other variations may be made.

As stated in the copending application Serial No. 342,735, considerable variation may be made in the tar distillation temperature and time of contact while still securing the advantages of the process.

In connection with the production of heat polymerizable unsaturated monomeric material boiling within the range from 210° to 350° C. the shorter times of contact tend to produce greater yields of this material.

The important factor in this respect is the separation of these materials from the residual tar without prolonged heating in contact with the pitchy materials of the residual tar. Stated in other words the greater the extent to which the polymerization of these materials into the residual tar is avoided, the higher the yield. After separation of these monomeric materials from the residual tar is effected the avoidance of their polymerization is not so important if it is desired to convert them into heat polymers, as any such polymers may be recovered from the distillate by distillation.

Of course if it is desired to utilize these monomeric materials otherwise than in the production of heat polymers, their polymerization by heat after separation from the residual tar should also be avoided.

Other processes of separation of light oil and dead oil from the pitchy constituents of residual tar, which avoid polymerization of these high boiling heat polymerizable materials prior to their separation from the residual tar, may be employed in the production of substantially pitch free material containing them.

For example, in the process described and claimed in the copending application Serial No. 353,034 filed August 17, 1940 by H. R. Batchelder, which has matured into Patent 2,383,362, granted August 21, 1945, the residual tar is separated from other constituents of the total tar by solvent extraction by a hydrocarbon solvent, such for example as ethane, propane, butane and others. In such a process heating may be substantially avoided by the employment of low temperatures and polymerization of the high boiling heat polymerizable monomeric materials substantially avoided, resulting in concentrations of these monomeric products of the order of 35% or higher in the portion of the extract boiling within the range from 210° to 350° C.

In the separation of lower boiling hydrocarbon material from the pitch constituents of residual tar by various methods, the oil separated may contain components boiling above 350° C. and it is not intended to preclude the presence of heat polymerizable monomeric material boiling outside the range of from 210° and 350° C. with the monomeric material boiling within that range nor is it intended to preclude the presence of heat polymers derived from monomers boiling outside said range along with polymers derived from monomers boiling within said range.

As hereinbefore stated, after polymerization the resin may be extracted by distillation in vacuum which may be assisted by steam. The yield of resin, melting point of the resin and other characteristics of the resin will depend upon the extent of the extraction, in other words, upon the proportion of associated oils left in the resin.

Exhaustive steam distillations of the resins of the present invention have produced resins having melting points of from 185° C. to 200° C., cube in mercury, as determined by the method and apparatus described in A. S. T. M. Designation D61–24 with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C.=Softening point °C.×1.25+2° C.

Melting point as used in this specification means melting point as determined by the above recited method or equivalent methods.

Lower melting point resins may be readily obtained in greater yields by less exhaustive extraction of the associated oils, thus resins ranging from very soft to hard resins having high melting points may readily be obtained.

It has been found that each 6% of associated oils left in the resin lowers the melting point about 10° C.

Heat resins of 120° C. cube in Hg melting point have been readily produced in yields of 20 to 30% of the dead oil in the case of tar distillate produced in accordance with the process of our copending application Serial No. 342,735 and resins of the same melting point in yields as high as 60% of the dead oil in the case of dead oil separated from extract produced in the process of application Serial No. 353,034.

Yields of resin of less than 120° melting point cube in Hg may be readily converted to yields of 120° melting point resin by subtracting a percentage of the actual yield equal to $$6\% \times \frac{120° \text{ C.} - \text{actual melting point }° \text{C.}}{10° \text{ C.}}$$

Conversely yields of resin of greater than 120° melting point, cube in Hg, may be converted to yields of 120° C. melting point resin by adding a percentage equal to $$6\% \times \frac{\text{Actual melting point }° \text{C.} - 120° \text{C.}}{10° \text{ C.}}$$

The heat polymerizable unsaturated monomeric material is preferably in sufficient concentration in that portion of the hydrocarbon material separated from the residual tar which boils within the range of from 210° to 350° C. to produce on polymerization by heat 120° C. melting point resin in quantity equal to at least 10 percent of the hydrocarbon material boiling within the range from 210° C. to 350° C. and preferably at least 20 percent or higher.

The color of the resins hereunder may vary from yellow to dark brown.

More specifically resins in accordance with the present invention have been rated in color in accordance with the following color comparison method.

Color standards are kept in 7 oz. square glass stoppered bottles and are sealed to prevent evaporation.

Three stock solutions are prepared.
A. 25 ml. of concentrated C. P. HCl diluted to 1 to 1.
B. 300 g. $FeCl_3.6H_2O$ and 180 ml. of Solution A.
C. 60 g. of $CoCl_2.6H_2O$ and 60 ml. of Solution A.

Solutions B and C are best prepared by grinding the salts in a mortar in the presence of dilute HCl and when completely dissolved filtering through a dry filter paper.

No more than 0.3% Ni. should be present in the chemicals used.

The individual standards are made up as follows:

| No. | Solution A | Solution B | Solution C | Water |
|---|---|---|---|---|
| | Ml. | Ml. | Ml. | Ml. |
| ½ | 250.0 | 0.9 | 0.7 | |
| 1 | 250.0 | 2.0 | 1.5 | |
| 1½ | 250.0 | 2.8 | 1.9 | |
| 2 | 250.0 | 4.0 | 2.5 | |
| 2½ | 250.0 | 5.6 | 3.2 | |
| 3 | 250.0 | 8.0 | 4.0 | |
| 3½ | 250.0 | 13.2 | 5.0 | |
| 4 | | 16.0 | 4.0 | 250.0 |
| 5 | | 20.0 | 5.5 | 200.0 |
| 6 | | 8.0 | 2.0 | 40.0 |
| 7 | | 16.0 | 3.0 | 40.0 |
| 8 | | 26.0 | 2.0 | 20.0 |
| 9 | | 50.0 | 4.0 | 11.1 |
| 10 | | 50.0 | 4.0 | |

Fractional standards may be prepared as follows:

Pipette 50 ml. of No. ½ into a 100 ml. volumetric flask and dilute with Solution A to 100 ml. ............................ No. ¼
Repeat the above procedure except use 50 ml. of No. ¼ instead of 50 ml. of No. ½ .......... ⅛
Repeat the above procedure except use 50 ml. of No. 1½ ......................................... ¾
Repeat the above procedure except use 50 ml. of No. ¾ ........................................... ⅜

In the color determination of the resin, 2 grams of resin are dissolved in 25 cc. or 21.7 grams of water white toluol. When solution is completed it is then transferred to a 1 oz. French square glass stoppered bottle and the color estimated by comparison with the standards.

In the event the color of the solution prepared in this manner is darker than color standard No. 10, 1 cc. of the resin solution is made up to 26 cc. with additional toluol. This may then be transferred to a French square glass stoppered bottle and the color estimated by comparison with the standards. Due to the fact that the resin solution has been diluted with additional toluol 10 will be added to the observed color reading in this case. If this second sample is still darker than No. 10 standard another dilution is performed in exactly the same manner. In this latter case 20 will be added to the observed color reading.

Heat polymer resins hereunder have been produced with colors ranging from 9 and below to 25 and above according to the above described method of estimating color.

Heat polymer resins hereunder produced from dead oil separated from residual tar by the distillation process of said copending application Serial No. 342,735 have shown a tendency to be lighter in color than those produced from dead oil obtained from the solvent extraction of tar with propane and butane as described in said copending application Serial No. 353,034. Also heat polymer resins produced from the lower boiling portions of the dead oil have shown a tendency to be lighter in color than heat polymer resins produced from the higher boiling portions especially such a portion as that boiling in a dead oil cut taken from 180° C. to 210° C. at 20 mm. Hg pressure.

The following examples will serve to further illustrate the present invention.

*Example 4*

Approximately 1000 grams of dead oil derived from the rapid distillation of oil gas tar in accordance with the process of said copending application Serial No. 342,735, and subsequent separation of the distillate was weighed into a 2 liter 3 necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tared 2 liter flask equipped with a ground glass neck.

The oil was accurately weighed at this point.

The flask was provided with means for measuring vapor temperatures and connected with condensing apparatus and with means for providing a vacuum including a pressure control device.

1. "Bumping" during distillation was avoided by folding several folds of iron wire to such length that one end reached slightly into the neck of the flask while the other end rested on the bottom of the flask.

2. The pressure was reduced to 100 mm. Hg absolute and heat applied by means of a Bunsen burner.

The distillation was continued at exactly 100 mm. Hg absolute pressure until the vapor temperature reached 180° C. During this first stage of the distillation care must be exercised to prevent crystallization of naphthalene if present as by employing a condenser at elevated temperature.

3. When the vapor temperature reached 180° C. at 100 mm. Hg absolute the flame was lowered and the pressure gradually reduced to 20 mm. Hg absolute, using care to avoid "carry over." When a pressure of 20 mm. Hg was reached the pressure was maintained at that value and the distillation continued until a vapor temperature of 195° C. was reached.

During the second stage of distillation the condenser may be cooled by cold water but taking care to avoid the solidification of anthracene if present.

The distillation was conducted rapidly, 5 to 10 cc. of oil per minute being taken over.

When a vapor temperature of 195° C. was reached the heat source was removed and air allowed to enter the apparatus slowly until atmospheric balance was restored.

The flask was then disconnected, the wire removed and the flask with the resin was weighed.

$$\frac{\text{Resin weight}}{\text{Total oil weight}} \times 100 = \% \text{ resin at the actual resin melting point.}$$

In the above operation the yield of resin was 29.3% with an actual melting point of 128° C. calculated to be equivalent to a yield of 34.1% at a melting point of 120° C. The color of the resin was 12 as determined by the hereinbefore described method of estimating color.

A straight run A. S. T. M. distillation of 100 cc. of the original oil gave the following data:

| | |
|---|---|
| First drop | °C 194 |
| 5 cc | °C 212 |
| 10 cc | °C 223 |
| 20 cc | °C 234.5 |
| 30 cc | °C 242.5 |
| 50 cc | °C 256.5 |
| 70 cc | °C 283.0 |
| 90 cc | °C 319.0 |
| Decomposition point | °C 319.0 |
| Total distillate | cc 87 |
| Density at 20° C | 1.0107 |

*Example 5*

Two samples of dead oil derived from the rapid distillation of oil gas tar in accordance with the process of said first mentioned copending application were blended in equal parts. 4 portions of the mixture of 1000 grams each were separately distilled under vacuum taking all similar cuts at the same point. Corresponding cuts from each distillation were blended.

One cut taken between 157° C. at 100 mm. Hg and 162° C. at 100 mm. Hg having a calculated 50 percent boiling point of 225° C. at 760 mm. Hg represented 12.5% of the total material distilled.

A portion of this cut was polymerized and the resin extracted as described in connection with Example 4. The yield of resin corrected to 120° C. melting point was 11.8%. The resin had a color of 10.

*Example 6*

A portion of a dead oil cut from the distillation described in Example 5, taken from 180° C. at 20 mm. Hg to 210° C. at 30 mm. Hg and having a calculated 50% boiling point at 320° C. at 760 mm. was polymerized and the resin extracted as described in connection with Example 4. The yield of resin corrected to 120° C. melting point was 21.3%. The resin had a color of 13.

*Example 7*

Approximately 1000 grams of dead oil derived from the propane extraction of an oil gas tar in accordance with the process of said copending application Serial No. 353,034 was polymerized and the resin extracted in the manner set forth in Example 4. The resulting resin had a melting point of 75° C. The yield corrected to 120° C. melting point was 55.9%. The color of the resin was 15.

A straight run distillation of 100 cc. of the original dead oil gave the following:

| | |
|---|---|
| First drop | °C__ 214 |
| 5 cc | °C__ 233 |
| 10 cc | °C__ 239 |
| 30 cc | °C__ 258.5 |
| 50 cc | °C__ 302.0 |
| 80 cc | °C__ 350 |
| Decomposition | °C__ 357 |
| Total distillate | cc__ 82 |
| Density of the dead oil at 20° C | 1.0770 |

*Example 8*

Approximately 1000 grams of dead oil derived from the extraction with butane of oil gas tar in accordance with the process of the said co-pending application Serial No. 353,034 was polymerized and the resin extracted as described in connection with Example 4 except that the second stage of the distillation was carried to a vapor temperature of 205° C.

The yield of resin was 63.2% having a melting point of 109.5° C. and calculated to be equivalent to a yield of 56.9% of 120° C. melting point resin. The color of the resin was 20.

A straight run A. S. T. M. distillation of 100 cc. of the dead oil gave the following:

| | |
|---|---|
| First drop | °C__ 219 |
| 5 cc | °C__ 232 |
| 10 cc | °C__ 237 |
| 20 cc | °C__ 246 |
| 50 cc | °C__ 323 |
| 70 cc | °C__ 363.5 |
| Decomposition | °C__ 364 |
| Total distillate | cc__ 72 |

The foregoing examples are given for purposes of illustration only as are the following descriptions of other characteristics of the resins hereunder and the invention is not to be considered necessarily limited thereby.

Density determinations have indicated that the density at 25° C. of the heat polymer resins hereunder generally falls within the approximate range 1.13–1.20, with resins produced from dead oil from the solvent extraction of tar tending to be somewhat higher than those produced from dead oil from rapid tar distillation.

The molecular weights of the resins hereunder necessarily vary with the melting point due to the presence of more or less associated oil. Determinations by the benzene freezing point depression method have shown molecular weights ranging from 308 to 758 over a range of melting points from 80.5° C. to 195° C. cube in Hg.

The fracture of the high melting point resins hereunder may be from conchoidal to hackly. In general the polymers are quite brittle.

The resins hereunder except those hardened by exhaustive steam distillation to a very high melting point will usually react positively to the anthraquinone reaction indicating the presence of anthracene, unless produced from lower boiling portions of the dead oil, which do not contain anthracene, or unless the anthracene were otherwise removed.

The resins hereunder will usually give but a slight diazo reaction indicating the substantial absence of phenols.

The resins hereunder usually will give negative Lieberman Storch reactions indicating absence of rosin acids.

On thermal decomposition of the resins of this invention appreciable yields of material boiling within the range from 210° C. to 350° C. will be produced.

The heat polymer resins of this invention are usually substantially completely soluble in $CS_2$ and 2° benzol.

The percent insoluble in a 50% petroleum ether 50% pentane solution varies with the melting point of the resin and may be of the order of 52% in the case of a resin of 95° C. cube in Hg melting point and of the order of 80% in the case of a resin of approximately 183° C. cube in Hg melting point.

The percent insoluble in 50% petroleum ether 50% pentane solution but soluble in $CCl_4$ may be of the order of 50% for a resin of 95° C. cube in Hg melting point and of the order of 74% in the case of a resin of 183° C. cube in Hg melting point.

The percent insoluble in both the petroleum ether pentane solution and $CCl_4$ is usually very low ranging from a fraction of a percent to the neighborhood of 6 or 7%.

The present invention has been principally described in connection with the processes of co-pending applications 342,735 and 353,034 which are directed to the treatment of tar emulsions. Oil gas tars and carburetted water gas tars in the production of which emulsions have been avoided and other separation processes may be employed as sources of the high boiling heat polymerizable monomeric material.

For example fractional condensation of the products of pyrolysis with filtration of entrained material might be resorted to, to separate the high boiling monomeric material from the pitch constituents.

The addition of other materials to the heat polymerizable monomeric unsaturated materials prior to polymerization or to the resins after polymerization may of course modify the properties of the resins produced.

Examples of such materials are other synthetic or natural resins, plasticizers, softeners, fillers, coloring materials, etc.

These and other modifications may be made without departing from the spirit of this invention.

We claim:

1. A process for producing heat-polymerized hydrocarbon resin from a hydrocarbon oil which has been physically separated from tar produced in the vapor phase pyrolysis of petroleum oil and which hydrocarbon oil is free from and of greater volatility than the pitch of said tar and contains hydrocarbons boiling between 210° C. and 350° C. which are polymerizable by the application to said hydrocarbon oil of heat alone, said heat polymerizable hydrocarbons being present in said hydrocarbon oil in amount greater than 5% of the total hydrocarbon oil boiling between 210° C. and 350° C., comprising heating said separated hydrocarbon oil sufficiently to produce heat-polymerized hydrocarbon resin by the heat polymerization of said hydrocarbons boiling between 210° C. and 350° C. and which are polymerizable by the application to said oil of heat alone.

2. A process for producing heat-polymerized hydrocarbon resin from a hydrocarbon oil which has been physically separated from tar-water emulsion produced in the vapor phase pyrolysis in the presence of steam of petroleum oil and which hydrocarbon oil is free from and of greater volatility than the pitch of said tar and contains hydrocarbons boiling between 210° C. and 350° C. which are polymerizable by the application to said hydrocarbon oil of heat alone, said heat polymerizable hydrocarbons being present in said hydrocarbon oil in amount greater than 30% of the total hydrocarbon oil boiling between 210° and 350° C., comprising heating said separated hydrocarbon oil sufficiently to produce heat-polymerized hydrocarbon resin by the heat polymerization of said hydrocarbons boiling between 210° C. and 350° C. and which are polymerizable by the application to said oil of heat alone.

3. A process for producing heat-polymerized hydrocarbon resin from a hydrocarbon oil which has been physically separated from tar-water emulsion produced in the vapor phase pyrolysis in the presence of steam of a naphthenic petroleum oil and which hydrocarbon oil is free from and of greater volatility than the pitch of said tar and contains aromatic hydrocarbons boiling between 235° C. and 350° C. which are polymerizable by the application to said hydrocarbon oil of heat alone, said heat-polymerizable hydrocarbons being present in said hydrocarbon oil in amount greater than 5% of the total hydrocarbon oil boiling between 235° C. and 350° C., comprising heating said separated hydrocarbon oil sufficiently to produce heat-polymerized hydrocarbon resin by the heat polymerization of said hydrocarbons boiling between 235° C. and 350° C. and which are polymerizable by the application to said oil of heat alone.

4. A process for producing heat-polymerized hydrocarbon resin from a hydrocarbon oil which has been physically separated from tar produced in the vapor phase pyrolysis of petroleum oil and which hydrocarbon oil is free from and of greater volatility than the pitch of said tar and contains aromatic hydrocarbons boiling between 265° C. and 350° C. which are polymerizable by the application to said hydrocarbon oil of heat alone, said heat-polymerizable hydrocarbons being present in said hydrocarbon oil in amount greater than 5% of the total hydrocarbon oil boiling between 265° C. and 350° C., comprising heating said separated hydrocarbon oil sufficiently to produce heat-polymerized hydrocarbon resin by the heat polymerization of said hydrocarbons boiling between 265° C. and 350° C. and which are polymerizable by the application to said oil of heat alone.

5. Resin produced by the process of claim 1.
6. Resin produced by the process of claim 2.
7. Resin produced by the process of claim 3.
8. Resin produced by the process of claim 4.

9. A hydrocarbon oil which has been physically separated from tar produced in the vapor phase pyrolysis of petroleum oil and which hydrocarbon oil is free from and of greater volatility than the pitch of said tar and contains hydrocarbons boiling between 210° C. and 350° C. which are polymerizable by the application to said hydrocarbon oil of heat alone, said heat-polymerizable hydrocarbons being present in said hydrocarbon oil in amount greater than 5% of the total hydrocarbon oil boiling between 210° C. and 350° C.

10. A hydrocarbon oil which has been physically separated from tar-water emulsion produced in the vapor phase pyrolysis in the presence of steam of a naphthenic petroleum oil and which hydrocarbon oil is free from and of greater volatility than the pitch of said tar and contains hydrocarbons boiling between 210° C. and 350° C. which are polymerizable by the application to said hydrocarbon oil of heat alone, said heat-polymerizable hydrocarbons being present in said hydrocarbon oil in amount greater than 5% of the total hydrocarbon oil boiling between 210° C. and 350° C.

EDWIN L. HALL.
HOWARD R. BATCHELDER.